United States Patent
Rice et al.

(10) Patent No.: US 11,573,125 B2
(45) Date of Patent: Feb. 7, 2023

(54) OPTICAL DETECTOR

(71) Applicant: UNIVERSITY OF WYOMING, Laramie, WY (US)

(72) Inventors: William D. Rice, Laramie, WY (US); Subash Kattel, Laramie, WY (US); Joseph R. Murphy, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 349 days.

(21) Appl. No.: 16/999,461

(22) Filed: Aug. 21, 2020

(65) Prior Publication Data
US 2021/0055162 A1   Feb. 25, 2021

Related U.S. Application Data

(60) Provisional application No. 62/891,169, filed on Aug. 23, 2019.

(51) Int. Cl.
| | |
|---|---|
| *G01J 3/457* | (2006.01) |
| *G01J 5/10* | (2006.01) |
| *G01J 5/48* | (2022.01) |
| *G01J 1/42* | (2006.01) |

(52) U.S. Cl.
CPC ............... *G01J 3/457* (2013.01); *G01J 5/10* (2013.01); *G01J 5/485* (2022.01); *G01J 2001/4295* (2013.01)

(58) Field of Classification Search
CPC .... G01J 3/457; G01J 5/10; G01J 5/485; G01J 2001/4295; G01J 1/0429; G01J 1/044; G01J 1/42
See application file for complete search history.

(56) References Cited

U.S. PATENT DOCUMENTS

| | | | |
|---|---|---|---|
| 9,228,968 B2* | 1/2016 | Kirihara | .................. H01L 27/22 |
| 10,326,069 B2* | 6/2019 | Ishida | ..................... H01L 35/34 |
| 10,651,368 B2* | 5/2020 | Avci | ........................ H01L 43/04 |

* cited by examiner

*Primary Examiner* — Seung C Sohn
(74) *Attorney, Agent, or Firm* — Patterson + Sheridan, LLP (57) ABSTRACT

Embodiments of the present disclosure generally relate to apparatus for and methods of detecting light utilizing the spin Seebeck effect (SSE). In an embodiment, a method for detecting broadband light is provided. The method includes generating a SSE in a device by illuminating the device with light, the device comprising a bilayer structure disposed over a substrate, the bilayer structure comprising a non-magnetic metal layer and a magnetic insulator layer. The method further includes measuring the SSE based on a field modulation method, determining, based on the measuring, an optically-created thermal gradient of the device, and detecting a wavelength range of the light. Apparatus for detecting broadband light are also described.

20 Claims, 12 Drawing Sheets

Unpolished        Polished

OPTICAL DETECTOR

CROSS-REFERENCE TO RELATED APPLICATIONS

This application claims priority to U.S. Provisional Patent Application Ser. No. 62/891,169 filed on Aug. 23, 2019, which is incorporated herein by reference in its entirety.

BACKGROUND

Field

Embodiments of the present disclosure generally relate to apparatus for and methods of detecting light utilizing the spin Seebeck effect.

Description of the Related Art

Optoelectronic devices are generally characterized as devices or systems which source, detect, and/or control electromagnetic radiation. Certain optoelectronic devices are electron spin-based devices that have both spin and electrical characteristics. Components in these spin-based devices include spin current generation, detection, transport, and manipulation. Distinct from all-electrical devices, spin-based devices utilize the flow of spins (e.g., a spin current density, Js) to transmit information and/or energy in lieu of a carrier charge. While the interactions between most types of matter and carrier spins may be described as "weak," pure spin currents (e.g., a net spin flow without net charge) can transmit energy more efficiently.

There are several methods of creating the Js including the spin Seebeck effect (SSE), spin pumping, the spin Hall effect, and the photo-spin-voltaic (PSV) effect. Of these methods, substantial attention has been devoted to the SSE for converting thermal energy to electrical energy (e.g., spin caloritronics). The SSE occurs when a thermal gradient, VT, produces a pure spin current, and unlike the electrical analog, the SSE has been generated not just in ferromagnetic metals and semiconductors, but also in magnetic insulators. The PSV effect produces Js from the unequal dephasing of spin-polarized photogenerated electrons and holes in metals such as platinum (Pt). The PSV effect is also distinct in comparison to other methods for pure-spin-current generation in that the PSV effect occurs in the non-magnetic metal top layer (e.g., Pt) and has only been observed to date via optical excitation. Although spin current density can be generated in a wide variety of magnetic materials through the aforementioned mechanisms, measuring spin current density primarily relies on either the inverse spin Hall effect (ISHE), which produces an electrical voltage from a spin current, or polarization-sensitive optical detection, which utilizes out-of-plane magnetization to alter the incoming light polarization.

Incorporation of spin functionality into technologically-important architectures is still in its infancy. Further, due to the magnetic nature of electron spins, the incorporation of spins into traditional, charge-based devices remains a technological hurdle. Additionally, device performance utilizing a carrier spin rather than a carrier charge is not well developed.

There is a need for new and improved methods of broadband light detection using the SSE. There is also a need to identify and determine advantages of spin-based devices with respect to traditional optoelectronics.

SUMMARY

Embodiments of the present disclosure generally relate to apparatus for and methods of detecting light utilizing the SSE. Certain embodiments of the present disclosure provide techniques for detecting light. An example technique includes utilizing the SSE in multilayer structures to detect light. For example, the multilayer structure enables light detection in a wavelength range of about 390 nm to about 2200 nm. The SSE and an amplitude-modulated technique can be utilized to detect light.

In an embodiment, a method for detecting broadband light is provided. The method includes generating a SSE in a device by illuminating the device with light, the device comprising a bilayer structure disposed over a substrate, the bilayer structure comprising a non-magnetic metal layer and a magnetic insulator layer. The method further includes measuring the SSE based on a field modulation method, determining, based on the measuring, an optically-created thermal gradient of the device, and detecting a wavelength range of the light.

In another embodiment, an apparatus for detecting broadband light is provided. The apparatus includes a multilayer structure, the multilayer structure configured to generate an electrical voltage from a spin current, an electromagnet configured to apply a magnetic field to the multilayer structure, a voltmeter coupled to the multilayer structure, and an excitation source to emit light, the excitation source optically coupled to the multilayer structure. The apparatus further includes an optical device configured to direct the light towards the multilayer structure, the optical device comprising a plurality of reflecting facets, a linear polarizer, a wave plate, and an optical chopper.

In another embodiment, an apparatus for detecting broadband light is provided. The apparatus includes a thermal electric cooler, a heat sink disposed over at least a portion of the thermal electric cooler, the heat sink thermally coupled to the thermal electric cooler. The apparatus further includes a multilayer structure disposed over at least a portion of the heat sink, the multilayer structure comprising a substrate, a magnetic insulator layer disposed over the substrate, and a non-magnetic metal layer disposed over the magnetic insulator layer, and a voltmeter coupled to the multilayer structure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

Figures included herein illustrate various embodiments of the disclosure. It is contemplated that elements and features of one embodiment may be beneficially incorporated in other embodiments without further recitation.

DETAILED DESCRIPTION

Embodiments of the present disclosure generally relate to apparatus for and methods of detecting light utilizing the spin Seebeck effect (SSE). The inventors have found new and improved methods of detecting light across a broad optical range utilizing the SSE. Briefly, and in some examples, the SSE is implemented in a multilayer structure and the SSE is measured based on a field-modulation method to determine an optically-created thermal gradient and to create a broadband optical detector. It is contemplated that embodiments described herein can be utilized to, e.g., increase the functionality of spin-based devices as an advantage over all-electrical based devices. In some examples, the SSE is implemented in devices having a multilayer structure. The multilayer structure includes a substrate and a bilayer structure having a non-magnetic metal layer disposed over at least a portion of a magnetic insulator layer, such as a Pt/$Y_3Fe_5O_{12}$ (YIG) bilayer structure. In such instances, the bulk SSE in the multilayer structure is used to detect light across a broad wavelength range of, e.g., about 390 nm to about 2200 nm. Further, and in some examples, the method for SSE detection is used to determine the thermal gradient across the multilayer structure.

In some cases, and as a result of the spin-current generated inverse spin Hall effect (ISHE) voltage, the spin-based device responds dynamically such that the response of the spin-based device matches closely with the bulk thermal behavior of the non-magnetic metal layer. The response of the spin-based device indicates that the bulk SSE in the spin-based device is the underlying detection mechanism for the spin-based device. As a result, the spin-based device detects light, for example, in the range of 390 nm to 2200 nm. Once the SSE is implemented, field modulation methods, such as an amplitude-modulated technique for SSE detection, measure the thermal gradient, VT, based on the optical heating from the Pt layer. Further, additional measurements may be determined including the ISHE voltage gradient. Based on the measurements, a longitudinal spin Seebeck coefficient is estimated for the spin-based device. The measurements and estimates determined indicate that featureless, broadband photodetection can be achieved by thermally-generated spin currents.

Examples

In the following non-limiting examples, the device having a multilayer structure is discussed in terms of a platinum (Pt) non-magnetic metal layer, a YIG magnetic insulator layer, and a gadolinium gallium garnet (GGG) substrate. It is contemplated that the multilayer structure can include other suitable non-magnetic materials, other magnetic insulator materials, and other substrates. In addition, the thickness of the platinum layer is referred to as $t_{Pt}$.

Figure 1A:
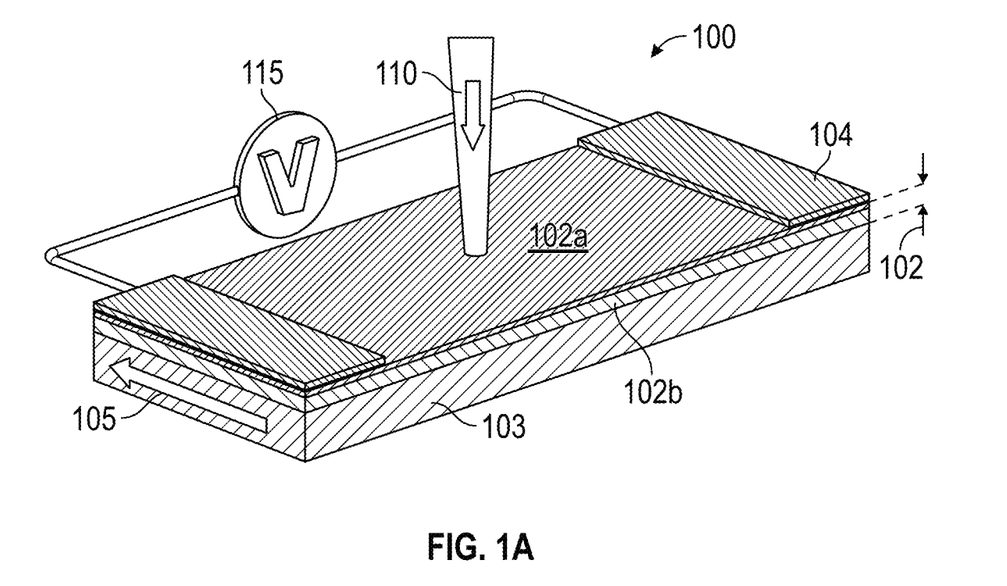
FIG. 1A illustrates an example device according to at least one embodiment of the present disclosure.
Figure 1B:
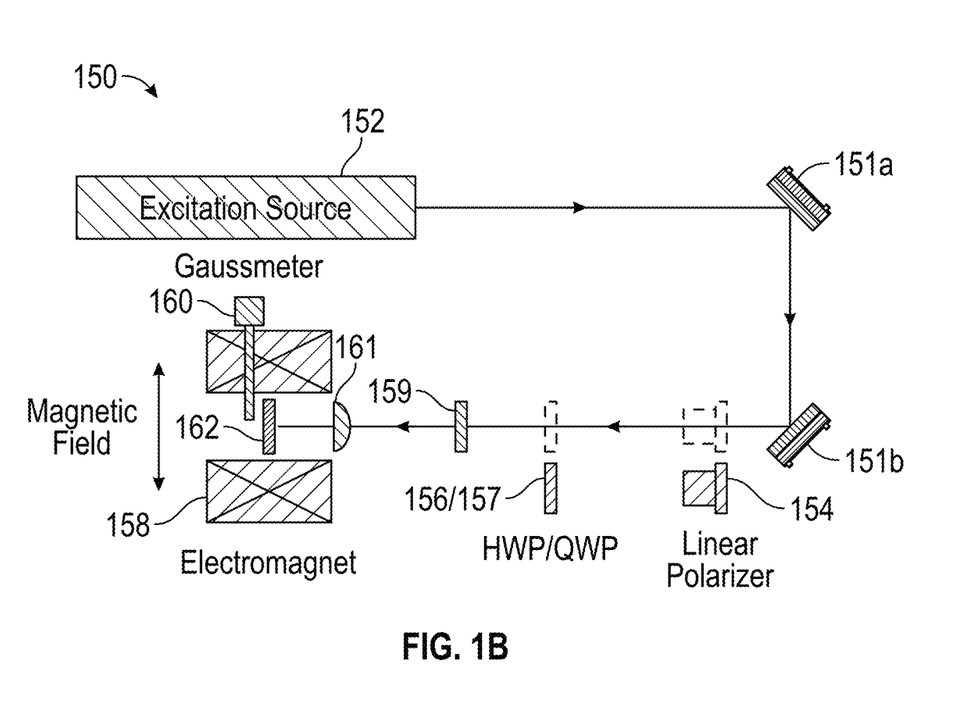
FIG. 1B illustrates a schematic of an example apparatus that can be used to measure, e.g., voltage, according to at least one embodiment of the present disclosure.

FIGS. 1A and 1B illustrate an example device 100 to detect light and an example voltage measurement apparatus 150 according to at least one embodiment of the present disclosure. The example device 100 includes a multilayer structure. The multilayer structure includes a substrate 103 and a bilayer structure 102 that includes a non-magnetic metal layer 102a disposed over at least a portion of a magnetic insulator layer 102b, e.g., Pt/YIG. The bilayer structure 102 is disposed over at least a portion of the substrate 103. The non-magnetic metal layer 102a includes a non-magnetic metal, e.g., Pt, tungsten (W), iridium (Ir), ruthenium (Ru), palladium (Pd), copper (Cu), gold (Au), bismuth (Bi), tantalum (Ta), or a non-magnetic alloy of these metals. The magnetic insulator layer 102b includes, e.g., nickel ferrite ($NiFe_2O_4$), a rare earth iron garnet, or a combination thereof. Rare earth metals include scandium (Sc), yttrium (Y), and/or metals of the lanthanide series such as lanthanum (La), cerium (Cs), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yt), and/or lutetium (Lu)). In at least one embodiment, the magnetic insulator layer 102b includes nickel ferrite, yttrium iron garnet (YIG, $Y_3Fe_5O_{12}$, or $Y_3Fe_2(FeO_4)_3$), europium iron garnet (EuIG), thulium iron garnet (TmIG), lutetium iron garnet (LuIG), gadolinium iron garnet (GdIG), or a combination thereof.

In some embodiments, the substrate 103 includes, e.g., gadolinium gallium garnet (GGG; $Gd_3Ga_5O_{12}$), yttrium aluminum garnet (YAG; $Y_3Al_5O_{15}$), strontium titanium oxide (STO; $SrTiO_3$), neodymium gallium garnet (NGG; $Nd_3Ga_5O_{12}$), silicon (Si), or a combination thereof. In some embodiments, the non-magnetic metal layer 102a is formed from a plurality of layers, the magnetic insulator layer 102b is formed from a plurality of layers, and/or the substrate 103 is formed from a plurality of layers.

The substrate 103 can be polished, for example, on the side or surface upon which the bilayer structure 102 is deposited, on the side or surface opposite from which the bilayer structure 102 is deposited, and/or on either side or both sides of the substrate 103. Additionally, or alternatively, edges of the bilayer structure 102 and/or edges of the substrate 103 can be polished. Polishing is performed to, e.g., enable optical excitation from one or more faces of the device 100. Contacts 104 to measure voltage are located at the ends of the device 100. In one embodiment, the contacts 104 are located at distal ends along a major axis of the device 100. The contacts 104 are made of a metal such as indium and/or tin. The contacts 104 are coupled to a voltmeter 115 to measure the voltage applied to the device 100. In one embodiment, the multilayer structure is fabricated according to the following non-limiting procedure. Briefly, a magnetic insulator layer 102b, such as a YIG layer, with a desired thickness (e.g., about 50 nm to about 20 μm, such as about 80 nm or about 15 μm) is grown via liquid-phase epitaxy on a substrate 103 such as GGG. RF magnetron sputtering is used to overcoat the magnetic insulator layer 102b with a non-magnetic metal layer 102a, such as a Pt layer.

Additionally, FIG. 1A depicts a magnetic field 105 being applied perpendicular to the incident light 110 direction, which can produce an in-plane YIG magnetization. In one embodiment, the magnetic field 105 is applied in a direction parallel to a minor axis of the device 100. In some cases, optical excitation of the bilayer structure 102 is from either the front side (non-magnetic metal layer 102a) or back side (substrate 103) of the device 100. As an example, the Pt layer side of the heterostructure is excited using a focused optical beam, such as a laser. The voltage can then be measured.

In some embodiments, the thickness of the non-magnetic metal layer 102a is from about 1 nm to about 20 nm, such as from about 2 nm to about 10 nm or from about 2 nm to about 6 nm. In at least one embodiment, the thickness of the non-magnetic metal layer 102a ranges from $thickness_1$ to $thickness_2$ (in units of nm), where each of $thickness_1$ and $thickness_2$ is, independently, about 0.5, about 1, about 2, about 3, about 4, about 5, about 6, about 7, about 8, about 9, about 10, about 11, about 12, about 13, about 14, about 15, about 16, about 17, about 18, about 19, or about 20, as long as $thickness_1 < thickness_2$. In some embodiments, the thickness of the magnetic insulator layer 102b is from about 50 nm to about 30,000 nm (30 μm), such as from about 100 nm to about 20,000 nm, such as from about 500 nm to about 15,000 nm, such as from about 1,000 nm to about 10,000 nm, such as from about 2,000 nm to about 8,000 nm. In at least one embodiment, the thickness of the magnetic insulator layer 102b ranges from $thickness_3$ to $thickness_4$ (in units of nm), where each of $thickness_3$ and $thickness_4$ is, independently, about 50, about 80, about 100, about 200, about 300, about 400, about 500, about 600, about 700, about 800, about 900, about 1,000, about 1,500, about 2,000, about 2,500, about 3,000, about 3,500, about 4,000, about 4,500, about 5,000, about 5,500, about 6,000, about 6,500, about 7,000, about 7,500, about 8,000, about 8,500, about 9,000, about 9,500, about 10,000, about 11,000, about 12,000, about 13,000, about 14,000, about 15,000, about 16,000, about 17,000, about 18,000, about 19,000, or about 20,000, as long as $thickness_3 < thickness_4$.

FIG. 1B illustrates a schematic of an example apparatus 150 utilized to measure and collect data such as a steady-state excitation signal. The apparatus 150 includes an excitation source 152, such as a laser. The light from the excitation source 152 is controlled by an optical device that includes one or more elements along the optical excitation path directed toward device 162. In some embodiments, device 162 is device 100. Depending upon, e.g., the measurement to be performed, the optical device includes a linear polarizer 154, a half-wave plate (HWP) 156, a quarter-wave plate (QWP) 157, a chopper 159 (e.g., a mechanical chopper and/or an optical chopper), reflecting facets 151a, 151b, lens 161, or a combination thereof. Examples of the chopper 159 include, but are not limited to, variable frequency rotating disc choppers, fixed frequency tuning fork choppers, and other optical shutters types. The linear polarizer 154 confines the light reflected by reflecting facets 151a, 151b to a single plane along the direction of propagation.

Wave plates, such as HWP 156 and QWP 157, alter the polarization state of the light wave travelling through it, and the chopper 159 is used to introduce a periodic interruption of the light path resulting in, e.g., an amplitude modulation. Lens 161 focuses the light onto the device and/or focus the light to increase the light intensity onto the device 162. Lens 161 can be a single lens or a series of lenses, filtered or unfiltered, concave or convex. In some embodiments, lens 161 temporally and/or spatially decorrelates the light passing through the lens 161, depending upon the desired implementation.

Two poles of an electromagnet 158 are used to create a magnetic field adjacent to the device 162. The magnetic field is monitored by any suitable device, such as a gaussmeter 160 or the like. Measurements of data, such as the steady-state excitation signal and voltage, are performed in the longitudinal SSE geometry. Here, a substantially uniform magnetic field is applied in the plane of the device 162 (e.g., device 100) placed between the poles of the electromagnet 158. In some embodiments, the device 162 is mounted such that the applied magnetic field is rotated about the device 162.

Where measurements of the voltage are performed along the longitudinal SSE geometry, as the field is swept, the device voltage can rapidly rise from negative to positive values, which reflect a change in the YIG layer magnetization. Additionally, for such measurements, a lock-in amplifier (LIA), which improves a signal-to-noise-ratio, is used and the LIA is triggered by a mechanical chopper and/or an optical chopper which modulates intensity of the light. In some cases, the LIA is phase adjusted to shift nearly the entire signal to an in-phase component.

Figure 1C:
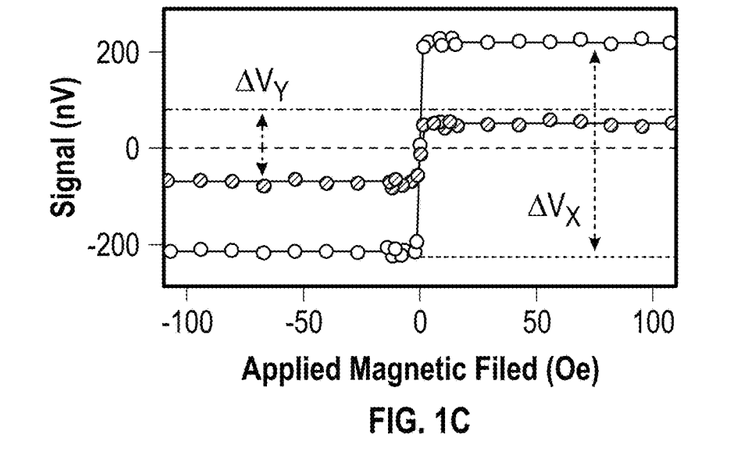
FIG. 1C is an example graph showing in- and out-of-phase signals, $V_X$ and $V_Y$, respectively, according to at least one embodiment of the present disclosure.

FIG. 1C is an exemplary graph showing in- and out-of-phase signals, $V_X$ and $V_Y$, respectively according to at least one embodiment. Here, the optically-generated voltage was measured between two pressed indium contacts using a LIA triggered by an optical chopper. The LIA is used as the applied magnetic field is swept. The resulting signal from a standard field sweep (about −100 Oe to about +100 Oe), and the corresponding error function fit to that data, is shown. In the graph of FIG. 1C, the signal magnitudes are the average difference in the in-phase voltage, $\Delta V_X$, between asymptotic positive and negative applied magnetic field values. As the field is swept, the device voltage rapidly rises from negative to positive values between about −30 and +30 Oe, reflecting the change in the YIG layer magnetization.

Figure 2A:
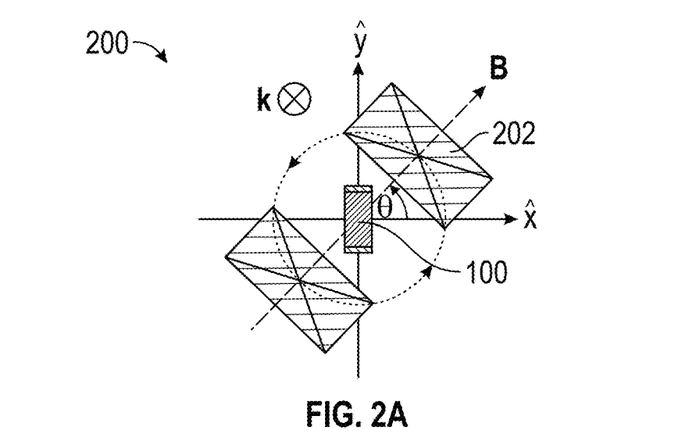
FIG. 2A illustrates a graphical depiction of an example rotational field dependence experiment according to at least one embodiment of the present disclosure.
Figure 2B:
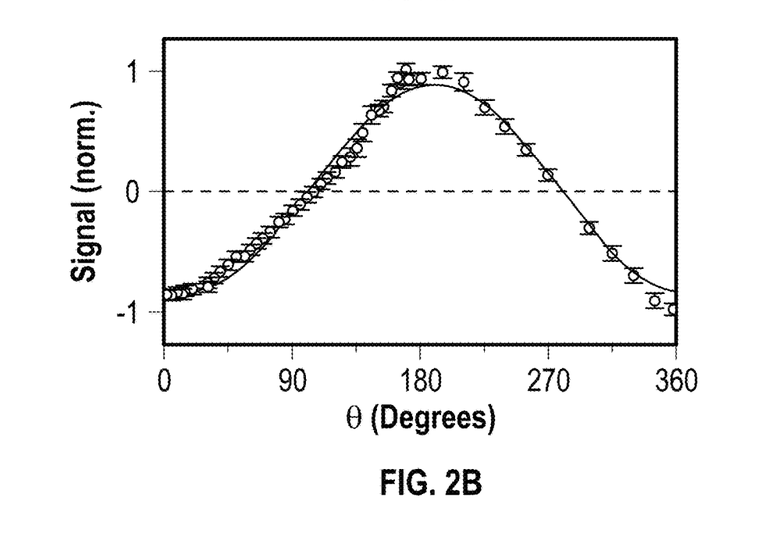
FIG. 2B illustrates a direction of magnetic field rotation with respect to an example device, and a resultant signal that is measured according to at least one embodiment of the present disclosure.

While FIGS. 1A-1C illustrate that the steady-state voltage obtained at the YIG layer may be fully magnetized to achieve full device responsivity, FIGS. 2A and 2B illustrate characteristics of a perpendicular, in-plane YIG layer magnetization, which may be performed by rotating the applied magnetic field about the device 100 and measuring the resulting signal. As illustrated, FIG. 2A is a depiction 200 of a rotational-field dependence experiment where electromagnets 202, such as electromagnets 158, are rotated 360 degrees about the device 100. The depiction 200 in FIG. 2A can be used with, e.g., apparatus shown in FIGS. 1B and 7.

FIG. 2B illustrates the direction the magnetic field is rotated with respect to the device 100, and the resultant signal that is measured. The YIG magnetization illustrates that traditional photoconductive effects can be negligible, and that despite a lack of photoconductivity in the Pt/YIG bilayer structure, the generation of a spin current enables the heterostructure to produce a photovoltage, which demonstrates new device functionality (e.g., optical detection) through the creation and utilization of Js.

In some cases, in order to determine whether spin-based devices are broadband optical detectors capable of detecting light, a set of spin-based devices were tested to determine whether the architecture of the spin-based device is capable of detecting light. FIGS. 3A-3E illustrate an example set of optical responses of an example device having a Pt/YIG bilayer structure. In the upper panel of FIG. 3A, the normalized ISHE voltage produced by incident light shows no change as the linear polarization angle (half-wave plate, HWP) is rotated. Here, the voltage signal is constant as the HWP is rotated as the linear polarization angle is rotated. Similarly, despite the strong spin-orbit coupling of Pt, the device signal can remain unchanged when the ellipticity of the light polarization is tuned from linear to elliptical to circular via rotation of a quarter-wave plate, QWP, as depicted in the lower panel of FIG. 3A.

Figure 3A:
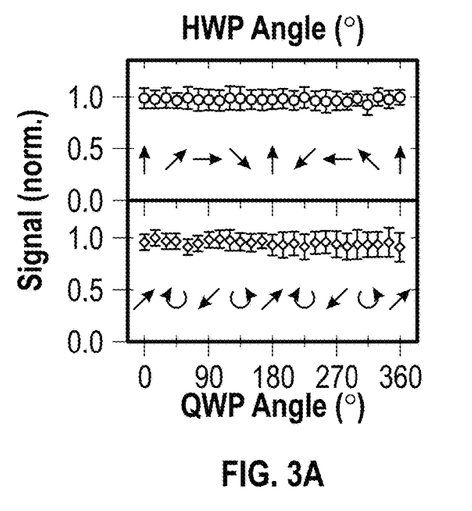
FIG. 3A is an example of normalized inverse spin Hall effect (ISHE) voltage produced by incident light on an example device as the linear polarization angle is rotated according to at least one embodiment of the present disclosure.
Figure 3B:
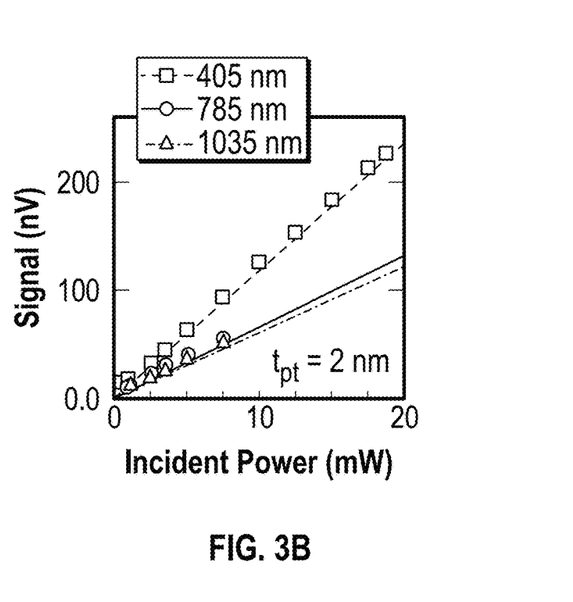
FIG. 3B is an exemplary graph illustrating an example device's signal power dependence from illumination by three wavelengths of light according to at least one embodiment of the present disclosure.

FIG. 3B is an exemplary graph illustrating an example device's signal power dependence from illumination at three wavelengths of light—about 405 nm, about 785 nm, and about 1035 nm. In this example, the device includes a Pt layer having a thickness ($t_{Pt}$) of about 2 nm. The results indicate that the signal scales linearly for several different wavelengths, which enables normalization of the signal by incident power (e.g., device responsivity). In some cases, the linearity enables defining a device responsivity for a given wavelength. As shown, the magnitude of the signal from a ~405 nm excitation is larger than the signals from ~785 nm and ~1035 nm excitation wavelengths.

Figure 3C:
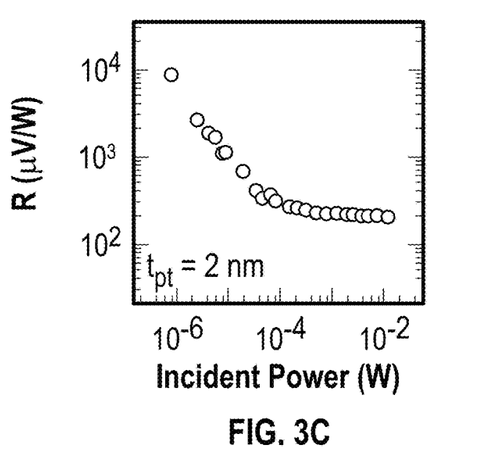
FIG. 3C is an exemplary graph illustrating an example device's responsivity as a function of incident power for 405 nm according to at least one embodiment of the present disclosure.

FIG. 3C is an exemplary graph illustrating an example device's responsivity as a function of incident power for 405 nm. In this example, the device includes a Pt layer having a thickness of about 2 nm. Despite the large change in incident power, the responsivity drop is less than a factor of 100, which compares favorably with power-dependent responsivity trends in conventional device structures such as black phosphorous carbide and graphene heterostructures. Although not shown, the magnitude of responsivity increases substantially with decreases in the thickness of the Pt layer and/or incident spot size.

Figure 3D:
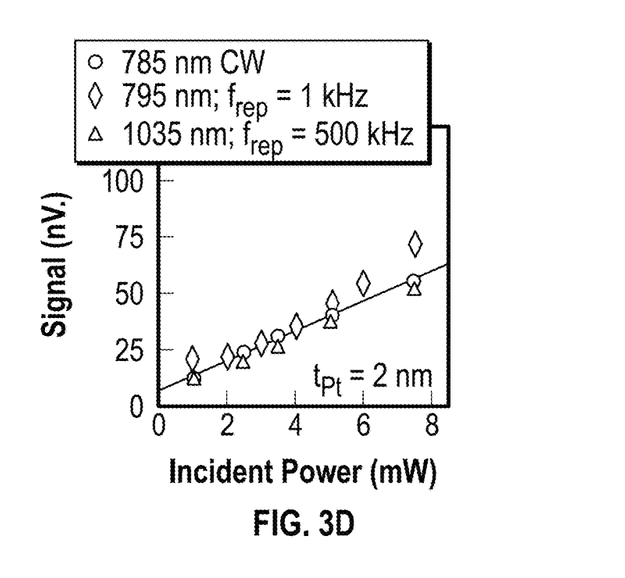
FIG. 3D is an exemplary graph illustrating an example device's power-dependent voltage response from excitation sources having different pulse repetition rates according to at least one embodiment of the present disclosure.
Figure 3E:
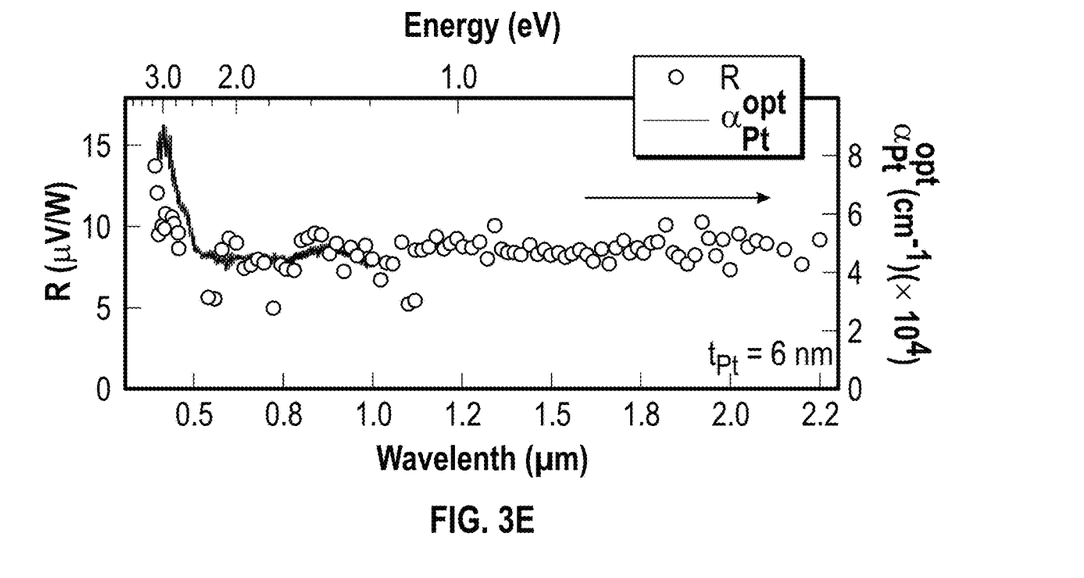
FIG. 3E is an exemplary graph illustrating an example device's responsivity and measured optical absorption coefficient of a Pt layer (~2 nm thickness) according to at least one embodiment of the present disclosure.

FIG. 3D illustrates an example device's power-dependent voltage response from excitation sources with different pulse repetition rates: (a) ~785 nm, CW; (b) ~795 nm, 1 kHz repetition rate ($f_{rep}$); and (c) ~795 nm, 500 kHz repetition rate. In this example, the device includes a Pt layer having a thickness of about 2 nm. The data in FIG. 3D indicates that the mechanism for generating a photovoltage is based on thermal effects, since the signal depends on the average incident power. FIG. 3E illustrates a spectral trend that follows closely the measured absorption coefficient of the Pt layer. In this example, the device includes a Pt layer having a thickness ($t_{Pt}$) of about 6 nm. As illustrated, the device responsivity (R) spanning from about 390 nm to about 2200 nm is flat from about 450 nm to about 2200 nm.

Figure 4:
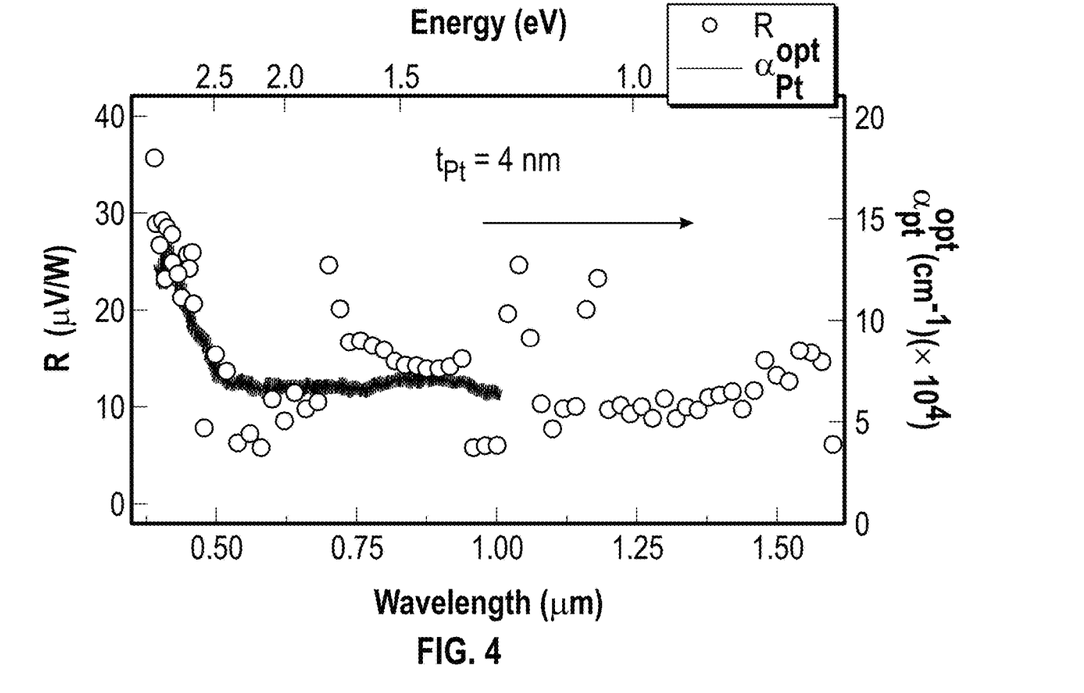
FIG. 4 is an exemplary graph illustrating an example device's responsivity and measured optical absorption coefficient of a Pt layer (~4 nm thickness) according to at least one embodiment of the present disclosure.
Figure 5A:
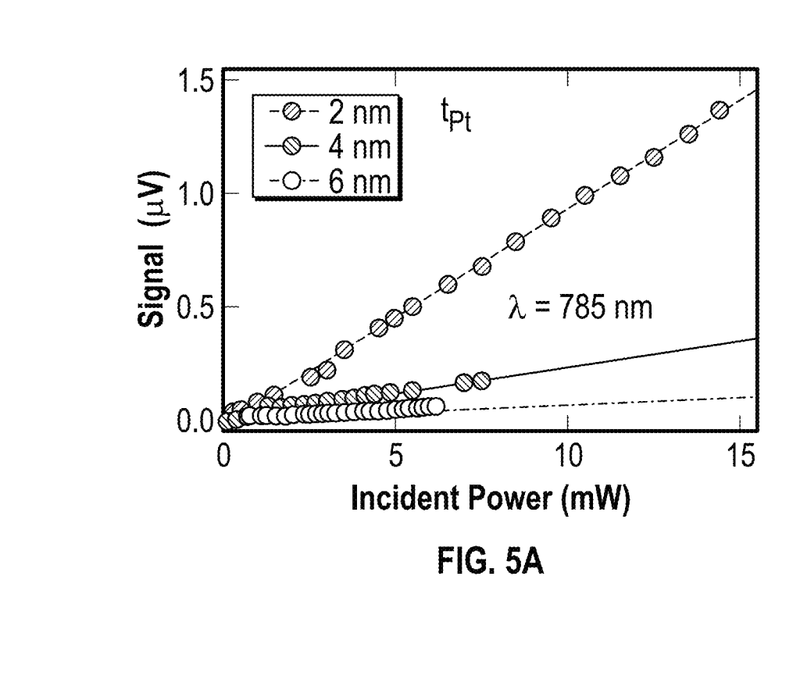
FIG. 5A is an exemplary graph illustrating data representative of a device's responsivity increasing as Pt thickness decreases according to at least one embodiment of the present disclosure.
Figure 5B:
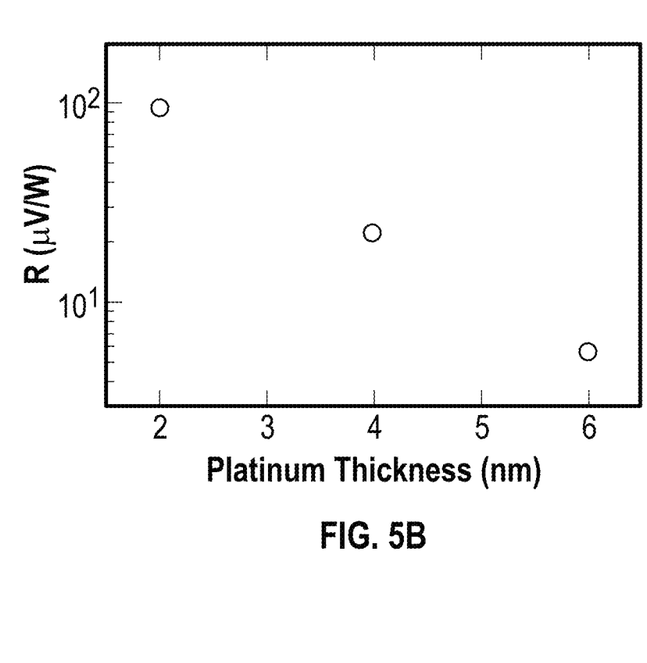
FIG. 5B is an exemplary graph illustrating data representative of a device's responsivity increasing as Pt thickness decreases according to at least one embodiment of the present disclosure

In some cases, the spectral trend depicted by device responsivity closely follows the measured optical absorption coefficient of the Pt layer ($\alpha_{Pt}^{opt}$) as shown in FIG. 3E, which in contrast to photodetectors, is flat across the entire measured wavelength range. Here, the optical absorption coefficient was measured from a wavelength of about 390 nm to about 1000 nm. The spectral dependencies of both the device responsivity and the optical absorption coefficient indicates that the absorption by the Pt layer is significant to the observed behavior. Further, in some cases, the spectral flatness as illustrated in FIG. 3E is not limited to a singular spin-based device, as FIG. 4 illustrates a similar wavelength dependence for a device having a Pt layer that is about 4 nm in thickness. Additionally, FIG. 5A and FIG. 5B illustrate that increasing Pt layer thickness (and overall Pt absorption) are, in certain embodiments, detrimental to device responsivity at a given wavelength.

FIGS. 6A-6D illustrate generating a thermal gradient across the magnetic insulator layer according to at least one embodiment. In particular, FIGS. 6A-6D illustrate how to produce the thermal gradient in a method alternative to illuminating the Pt top layer. Here, the magnetic insulator layer is YIG.

Figure 6A:
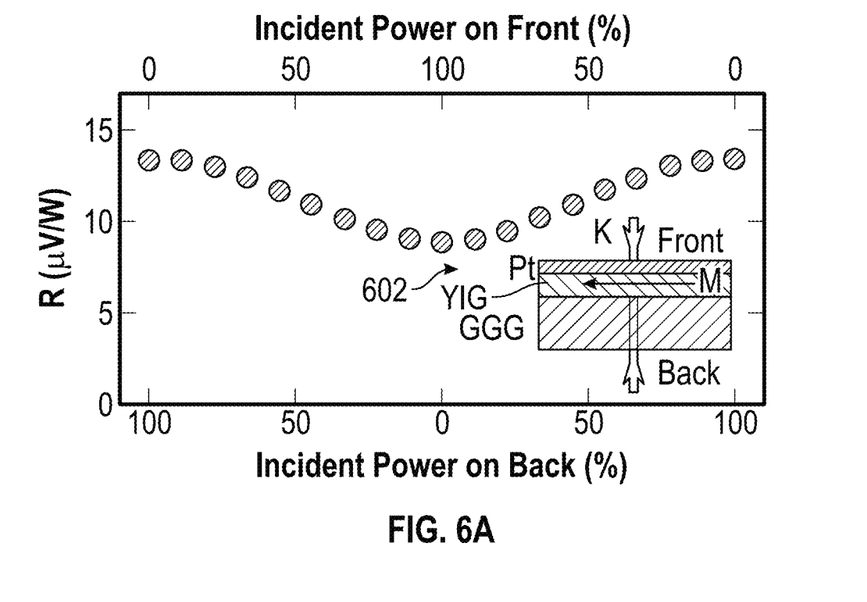
FIG. 6A illustrates an example device's responsivity as optical excitation is varied between the front and back of the device according to at least one embodiment of the present disclosure.
Figure 6B:
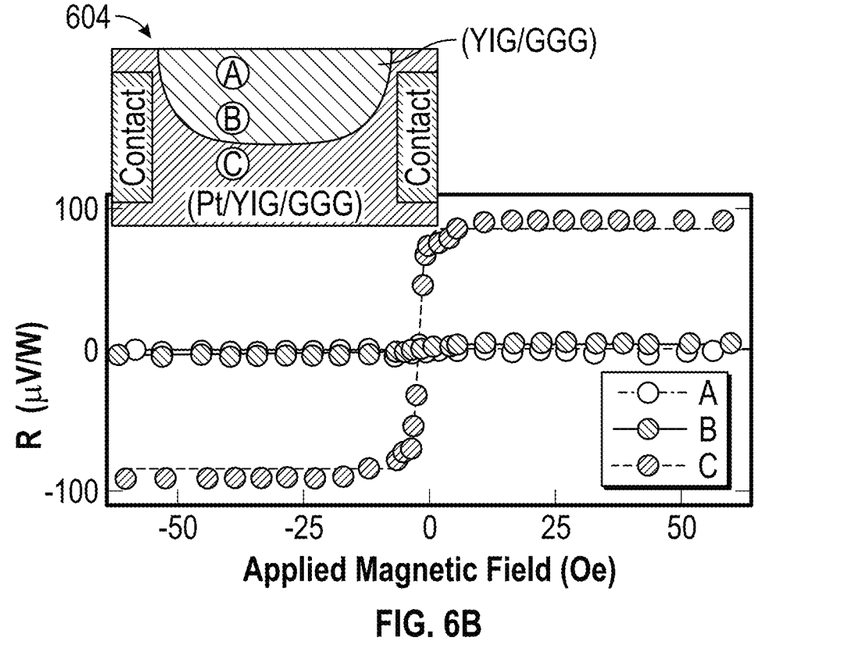
FIG. 6B illustrates an example device's responsivity to illumination with and without a Pt layer according to at least one embodiment of the present disclosure.
Figure 7:
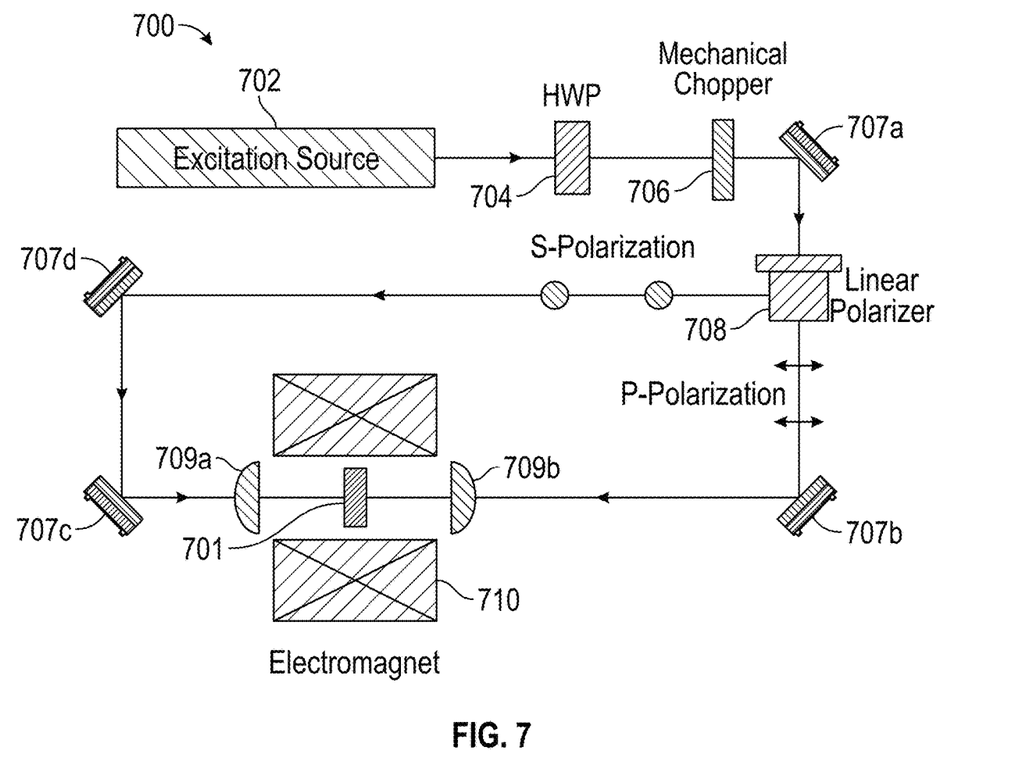
FIG. 7 is a schematic of an example double-sided illumination apparatus according to at least one embodiment of the present disclosure.

The graph of FIG. 6A illustrates the device responsivity as optical excitation is varied between the front and back of the device. In some cases, as shown in the inset 602, the GGG substrate can be illuminated from the backside of the bilayer in order to flip the sign of VT. When the illumination direction is switched from front to back, the sign of the responsivity (R) does not change. Thus, the optically-generated thermal gradient remains the same regardless of the orientation of the illumination. A schematic of an example apparatus 700 used for the double-sided illumination is depicted in FIG. 7 according to at least one embodiment. The apparatus 700 includes an excitation source 702 such as a laser. The light from the excitation source can be controlled by an optical device that include a half-wave plate (HWP) 704, a chopper 706 (e.g., a mechanical chopper and/or an optical chopper), a linear polarizer 708, a plurality of reflecting facets 707 (such as reflecting facets 707a, 707b, 707c, and 707d, a plurality of lenses (e.g., lens 709a and lens 709b). Two poles of an electromagnet 710 are used to create a magnetic field. The magnetic field is applied to the device 701 (e.g., device 100). In some embodiments, the device 701 is mounted such that the applied magnetic field can be rotated about the device 701. As illustrated in FIG. 7, the HWP 704 can be rotated to manipulate the proportion of the light from 0 to 100% incident on each side of the device 701. Examples of the chopper 706 include, but are not limited to, variable frequency rotating disc choppers, fixed frequency tuning fork choppers, and other optical shutters types. Lens 709a and lens 709b can each, independently, be a single lens or a series of lenses, filtered or unfiltered, concave or convex. Lens 709a and lens 709b can each, independently, focus the light onto the device 701 and/or focus the light to increase the light intensity onto the device 701. In some embodiments, lens 709a and/or lens 709b temporally and/or spatially decorrelates the light passing through it, depending upon the desired implementation FIG. 6B illustrates an example device's responsivity to illumination with and without the Pt layer and indicates the lack of appreciable optical heating from either the YIG layer or the GGG layer. The results of the graph in FIG. 6B are based on mechanically removing part of the Pt layer and exposing the underlying YIG and GGG. The inset 604 shows the illumination spot on the device in a region with the Pt layer (represented by 'C') and without the Pt layer ('A' and 'B'). Here, illumination was performed at a wavelength of about 405 nm across the device in areas with and without a Pt layer was performed. The responsivity signals obtained from illuminating Pt/YIG/GGG ('C') and two different locations ('A' and 'B') on YIG/GGG with the Pt top layer removed are shown, and each line is a fit to the data. When the beam was incident on the Pt layer, a large responsivity signal was observed. However, when light illuminated the YIG/GGG section, a very small responsivity signal was measured. A similar result was obtained when the GGG bottom layer was directly illuminated. Taken together, these results indicate that the VT ($\propto V_{ISHE}$) across the YIG layer is dominated by optical heating of the Pt layer (e.g., contributions from illuminating the GGG substrate are negligible). Further examples and similar results illustrating that the YIG layer is dominated by optical heating of the Pt layer (e.g., the contributions from illuminating the GGG substrate are negligible) are illustrated in FIG. 8 and FIG. 9.

Figure 6C:
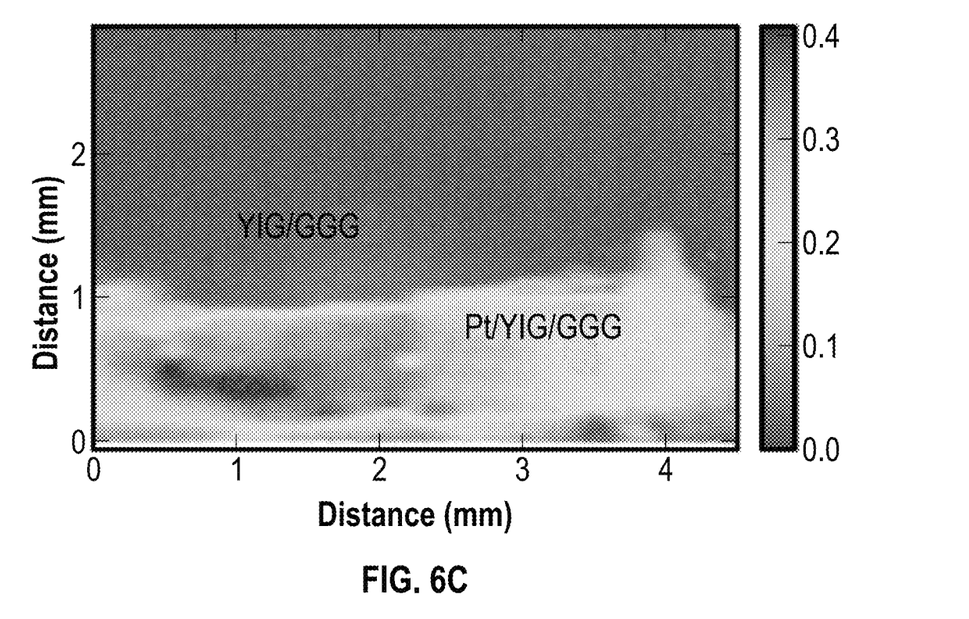
FIG. 6C illustrates a two-dimensional mapping of the voltage signal showing variation across an example device with partially removed Pt areas according to at least one embodiment of the present disclosure.
Figure 6D:
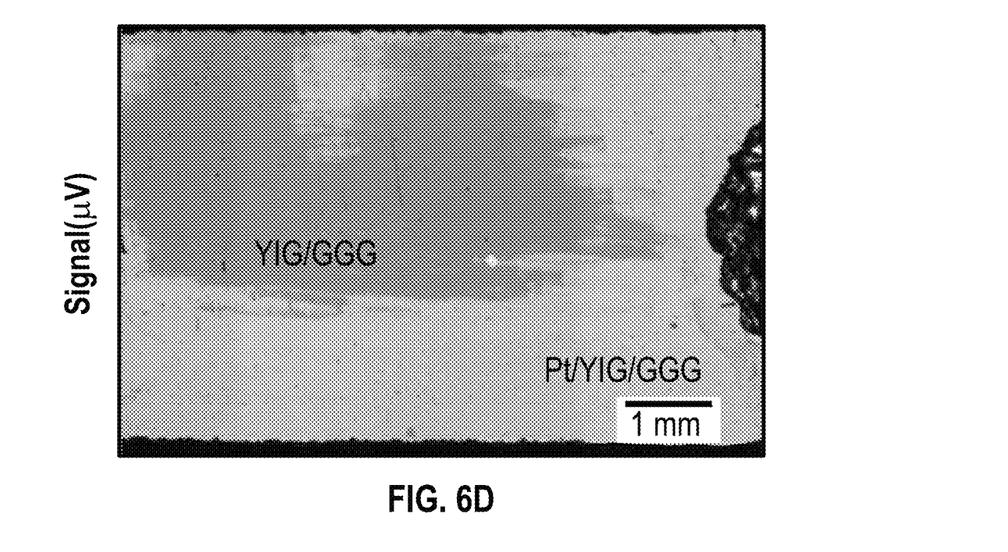
FIG. 6D is an optical image of the example device where the signal mapping shown in FIG. 6C was performed according to at least one embodiment of the present disclosure.

FIG. 6C illustrates a two-dimensional mapping of the voltage signal showing variation across an example device with partially removed Pt areas, and FIG. 6D is an optical image of the example device where the signal mapping shown in FIG. 6C was performed. Here, the example device generates a voltage when the optical beam illuminates a portion of the intact Pt layer. In some cases, there may not be an appreciable signal when the optical excitation is on Pt portions that are disconnected from the indium contacts, which confirms the SSE is the dominant spin current generation mechanism.

Figure 8A:
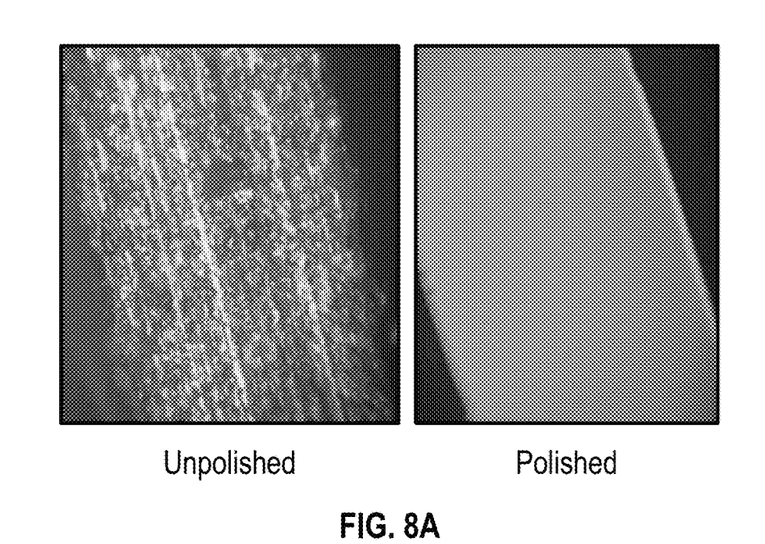
FIG. 8A shows images of the edge of an example device before (left) and after (right) polishing according to at least one embodiment of the present disclosure.
Figure 8B:
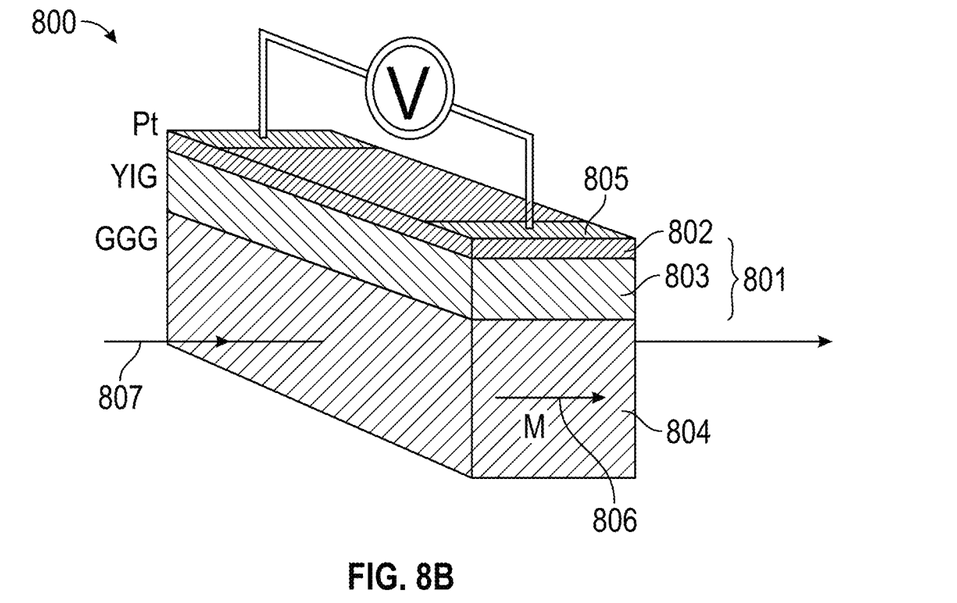
FIG. 8B depicts an example of an edge illumination detector device according to at least one embodiment of the present disclosure.

FIGS. 8A and 8B illustrate example optical images and a schematic of an example edge illumination detector device. In FIG. 8A, the example optical images show the edge of the device before (left) and after (right) polishing. In FIG. 8B, the edge illumination detector device 800 is illustrated. In some embodiments, the device 800 is used to detect light. The device 800 includes a multilayer structure having a substrate 804 and a bilayer structure 801. The bilayer structure 801 includes a non-magnetic metal layer 802 and a magnetic insulator layer 803, e.g., Pt/YIG. The bilayer structure 801 is disposed over the substrate 804 (e.g., GGG). Contacts 805 to measure voltage are located at the ends of the device 800. The contacts 805 are made of a metal such as indium and/or tin. The magnetic field 806 is applied parallel to the incident light 807 direction. As an example, the device 800 is excited from the edge (as shown) using a focused optical beam, such as a laser excitation source. In some embodiments, the edge illumination detector device 800 can be used with the setup shown in FIGS. 1B and 7.

Figure 9:
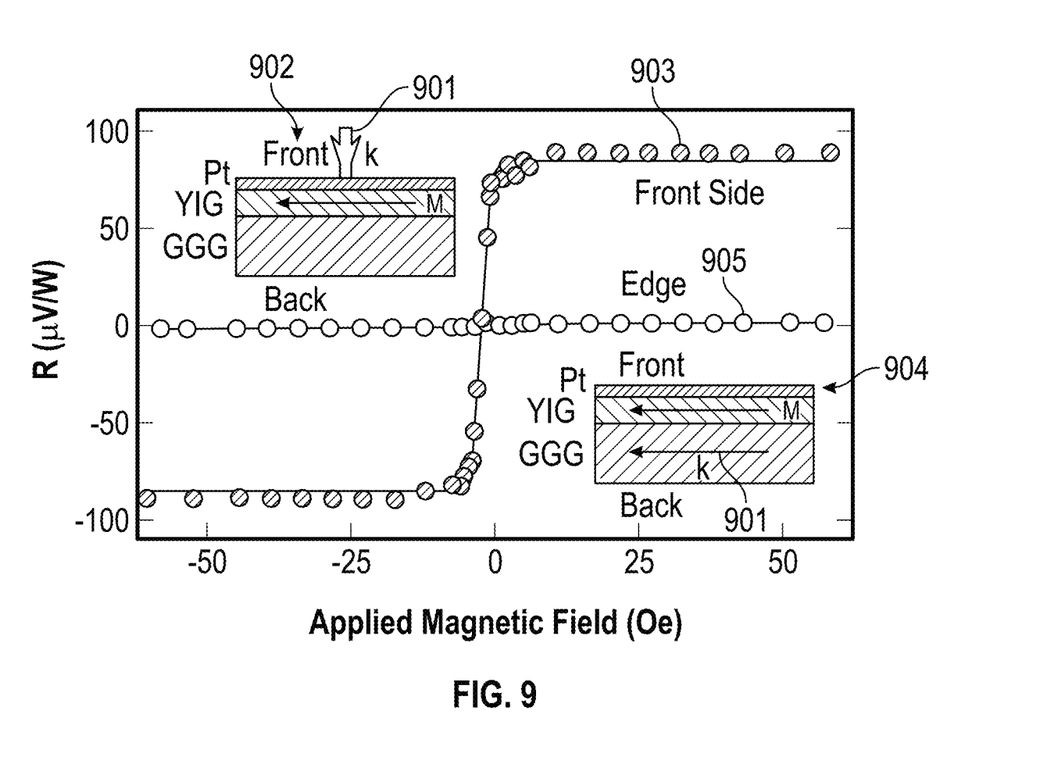
FIG. 9 is an exemplary graph depicting the results of illuminating a substrate directly from a side of an example device as compared to illuminating a front side of the example device according to at least one embodiment of the present disclosure.

FIG. 9 is an exemplary graph depicting the results of illuminating the GGG substrate of the example multilayer structure directly from the side as compared to illuminating the front side of the example multilayer structure. In some cases, when light 901 from a laser (e.g., a 785 nm diode laser) is incident on the front side of the device 902, a large signal 903 is observed, as illustrated in exemplary graph of FIG. 9. In other cases, when light 901 from the laser is incident only on the GGG substrate of the device 904, a very small signal 905 is observed.

Figure 10A:
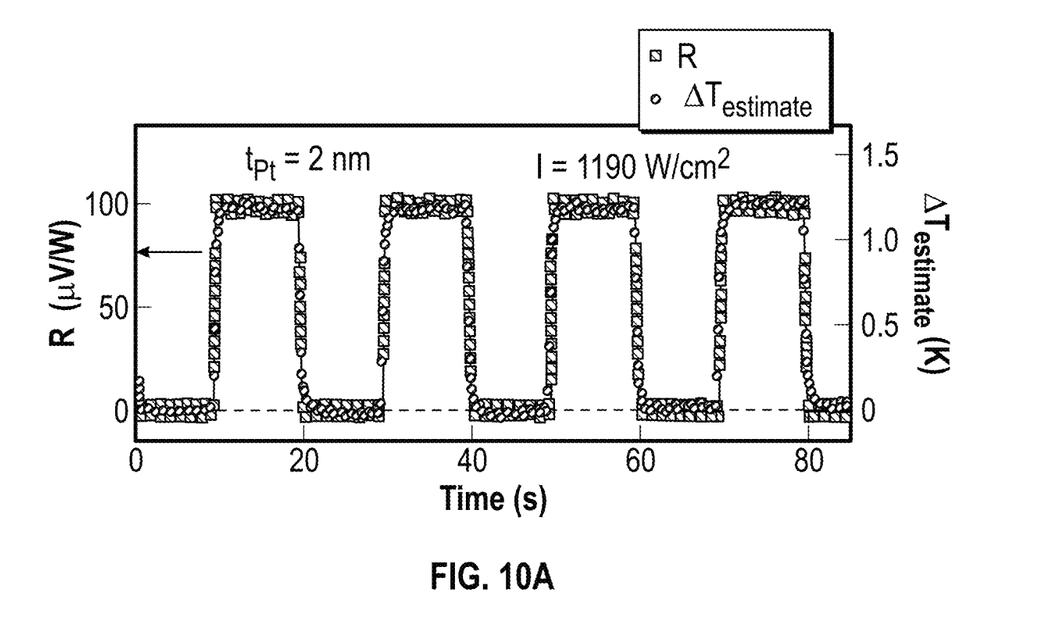
FIG. 10A is an exemplary graph illustrating an example device's responsivity with illumination on and off according to at least one embodiment of the present disclosure.
Figure 10B:
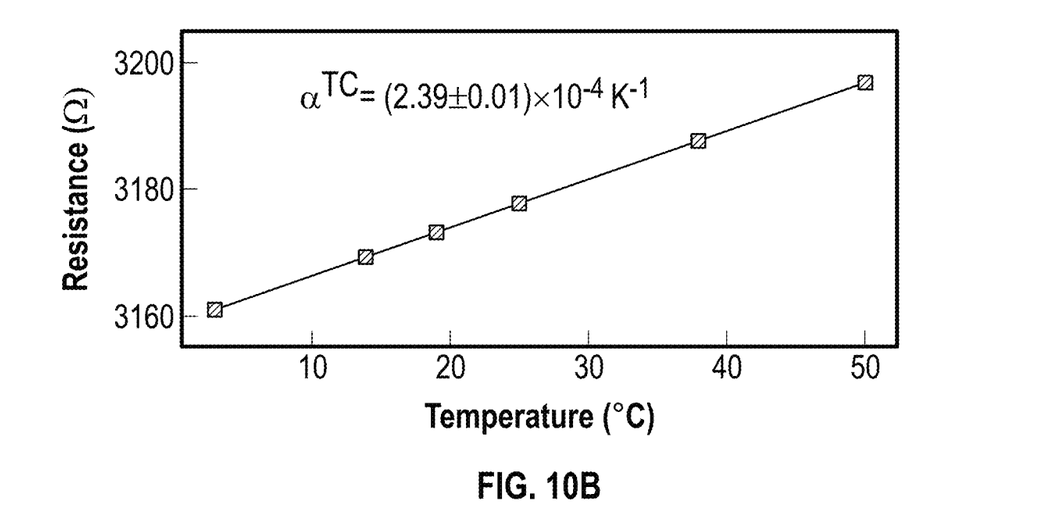
FIG. 10B is an exemplary graph illustrating an increase in resistance of an example device's Pt layer with an increase in temperature according to at least one embodiment of the present disclosure

FIGS. 10A and 10B illustrate a comparison of thermal and electronic response times of an example device. In FIG. 10A, the exemplary graph illustrates device responsivity with the illumination on and off (light-on/light-off) in twenty second intervals over a duration of about 85 seconds. When the light is unblocked, the device immediately generate a voltage, and further, the thermal response of the Pt layer to the light is such that the thermal response follows the signal response. In such cases, a rapid temperature rise and equilibration of the Pt layer temperature indicates an SSE process rather than, for example, a photocarrier-meditated process. Further, the device response is faster than the time resolution of the LIA, and the dynamics of the power-normalized signal and bulk resistivity change to optical excitation are approximately the same. The exemplary graph of FIG. 10B illustrates an increase in resistance of the Pt layer with the temperature (the line is the linear fit to the data). The measured value of the temperature coefficient $\alpha^{TC}$ was determined to be about $2.39 \times 10^{-4}$ $K^{-1}$ when illuminated with 1190 W/cm$^2$ using a 405 nm laser as the excitation source.

Figure 11:
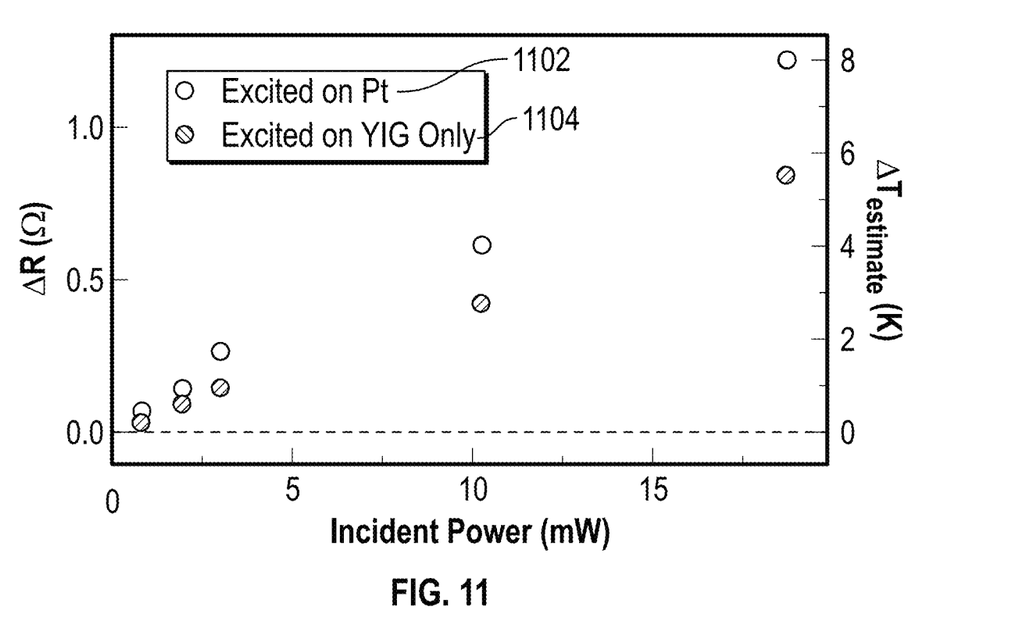
FIG. 11 illustrates data representative of temperature changes in an example device's Pt top layer according to at least one embodiment of the present disclosure.

While FIGS. 10A and 10B depict how the estimated temperature change of the Pt layer results from optical excitation of the device, FIG. 11 illustrates that when the Pt top layer is partially removed, once the device is exposed to optical excitation, there can be a significant temperature change in the adjacent Pt top layer. For the data in FIG. 11, the Pt layer temperature was measured as a function of optical power when the beam was on (1102) and off (1104) of the Pt layer. A significant temperature change was observed for the adjacent Pt top layer. Such a significant temperature change is believed to indicate that thermal energy from the absorbed light can diffuse through the YIG/GGG.

Figure 12A:
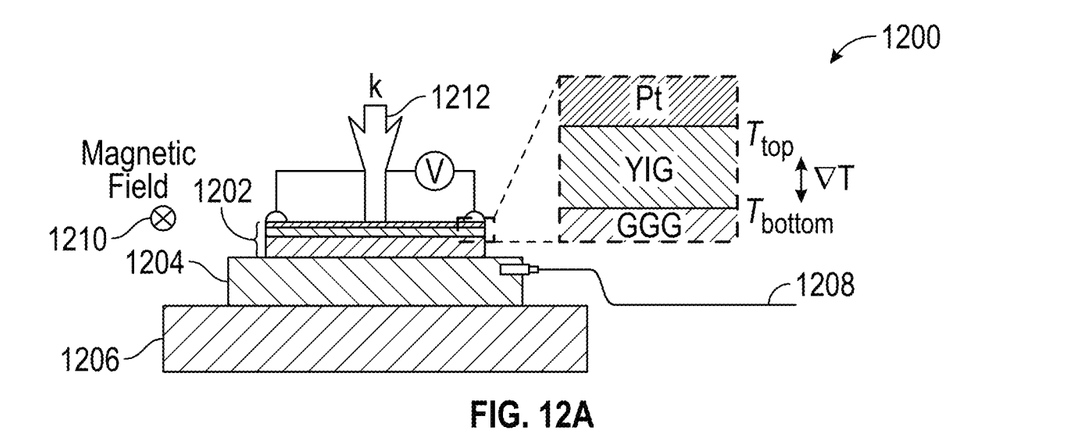
FIG. 12A is an example apparatus for measuring SSE using a field amplitude-modulation technique according to at least one embodiment of the present disclosure.
Figure 12B:
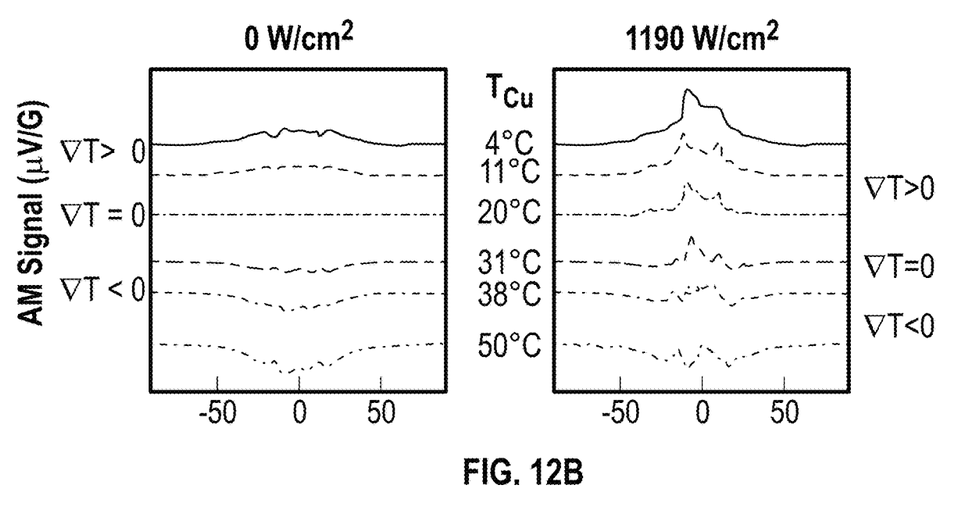
FIG. 12B is an exemplary graph illustrating the amplitude-modulated signal with different copper heat sink temperatures, $T_{Cu}$, with and without optical illumination according to at least one embodiment of the present disclosure.
Figure 12C:
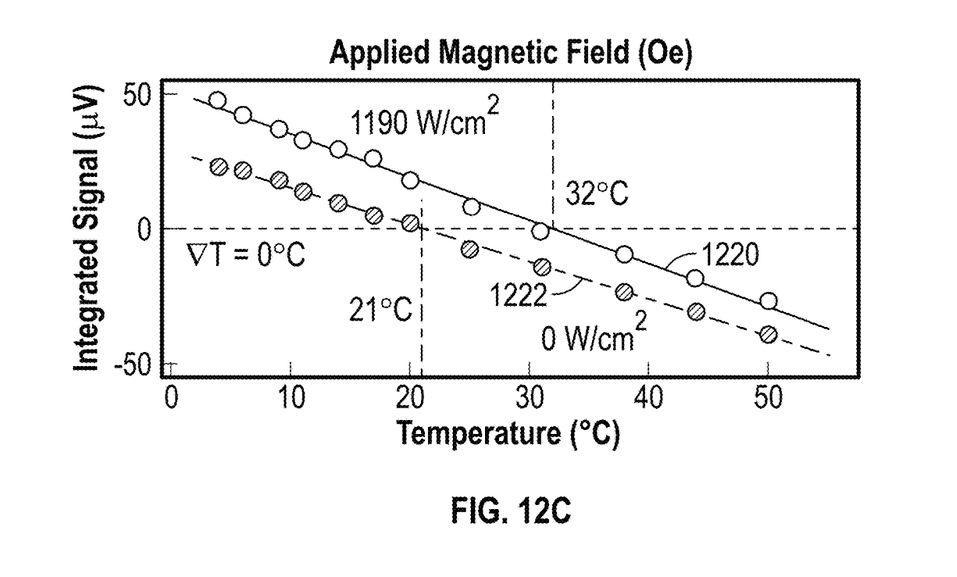
FIG. 12C is an exemplary graph illustrating an integrated SSE AM signal as a function of $T_{Cu}$ with and without optical illumination according to at least one embodiment of the present disclosure.

FIGS. 12A-12C illustrate a measurement of the SSE using a field amplitude-modulation technique. FIG. 12A illustrates an example apparatus 1200 for measuring the SSE. The apparatus 1200 can be used with the setup shown in, e.g., FIGS. 1B and 7. The apparatus includes a device 1202 that includes a bilayer structure and a substrate, such as device 100, e.g., a Pt/YIG/GGG device. The device 1202 is disposed over at least a portion of a heat sink 1204, such as a copper heat sink. The heat sink 1204 is disposed over at least a portion of a thermal electric cooler (TEC) 1206 for backside temperature control. The heat sink 1204 is also thermally coupled to the TEC. A probe 1208, such as a thermocouple, can be attached to the heat sink 1204 for temperature measurements. In some embodiments, contacts, such as the contacts 104 of FIG. 1, are located at the ends of the device 1202 to measure the voltage. The contacts can be made of a metal such as indium and/or tin.

As depicted, a magnetic field 1210 is perpendicular to both the incoming light (k) 1212 and to the major axis of the device 1202. In some embodiments, by removing the optical chopper, adding a slow and small field modulation, and locking on to a desired modulation frequency during magnetic field sweeps, a voltage signal can be obtained that corresponds to the derivative of the device response. In at least one embodiment, the amplitude of the field modulation ranges from amplitude$_1$ to amplitude$_2$ (in units of G), where each of amplitude$_1$ and amplitude$_2$ is, independently, about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, or about 3.0, as long as amplitude$_1$<amplitude$_2$. In at least one embodiment, the modulation frequency ranges from frequency$_1$ to frequency$_2$ (in units of Hz), where each of frequency$_1$ and frequency$_2$ is, independently, 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.6, about 9.7, about 9.8, about 9.9, about 10.0, about 10.1, about 10.2, about 10.3, about 10.4, about 10.5, about 10.6, about 10.7, about 10.8, about 10.9, about 11.0, about 11.1, about 11.2, about 11.3, about 11.4, about 11.5, about 11.6, about 11.7, about 11.8, about 11.9, about 12.0, about 12.1, about 12.2, about 12.3, about 12.4, about 12.5, about 12.6, about 12.7, about 12.8, about 12.9, about 13.0, about 13.1, about 13.2, about 13.3, about 13.4, about 13.5, about 13.6, about 13.7, about 13.8, about 13.9, about 14.0, about 14.1, about 14.2, about 14.3, about 14.4, about 14.5, about 14.6, about 14.7, about 14.8, about 14.9, about 15.0, about 15.1, about 15.2, about 15.3, about 15.4, about 15.5, about 15.6, about 15.7, about 15.8, about 15.9, about 16.0, about 16.1, about 16.2, about 16.3, about 16.4, about 16.5, about 16.6, about 16.7, about 16.8, about 16.9, about 17.0, about 17.1, about 17.2, about 17.3, about 17.4, about 17.5, about 17.6, about 17.7, about 17.8, about 17.9, about 18.0, about 18.1, about 18.2, about 18.3, about 18.4, about 18.5, about 18.6, about 18.7, about 18.8, about 18.9, or about 19.0, as long as frequency$_1$<frequency$_2$. For example, the amplitude of the field modulation is about 1 G and/or the modulation frequency can be about 13.1 Hz.

The exemplary graph of FIG. 12B illustrates the amplitude-modulated signal with different copper heat sink temperatures, $T_{Cu}$, with optical illumination (right panel) and without optical illumination (left panel) by an excitation source (1190 W/cm$^2$; 405 nm laser). As the $T_{Cu}$ increases from about 4° C. to about 50° C., the temperature gradient across the YIG layer, VT, correspondingly goes from positive to zero to negative, which is reflected in the magnitude and sign of the field-scanned AM signal. The addition of a 1190 W/cm$^2$ intensity beam at 405 nm laser shifts VT by a certain amount. Given that the AM signal is proportional to the derivative of the optical-modulation signal, the integration of the curves shown in FIG. 12B is comparable to the SSE signal. FIG. 12C depicts, in an exemplary graph, an integrated SSE AM signal as a function of $T_{Cu}$ with optical illumination (1220) and without optical illumination (1222). In some cases, the spectral responsivity from about 390 nm to about 2200 nm is attributed to Pt absorption, which creates a spin current from the SSE. In some non-limiting examples, the thermal gradient across the underlying YIG layer from the incident light used produces a spin current that is about 0.73K/µm. Further, in some cases, the device 1200 uses spin current to produce a voltage response from light.

Described herein is an apparatus for and method of spin-based detection of broadband light across a wavelength range of about 390 nm to about 2200 nm. The spectral responsivity from about 390 nm to about 2200 nm is attributed to Pt absorption which creates a spin current from the SSE. Unlike conventional optical detectors that are fully reliant on charge carriers, the apparatus and methods described herein use spin current to produce a voltage response from light.

The descriptions of various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable one of ordinary skill in the art to understand the embodiments disclosed herein.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise.

While the foregoing is directed to embodiments of the present disclosure, other and further embodiments of the disclosure may be devised without departing from the basic scope thereof, and the scope thereof is determined by the claims that follow.

What is claimed is:

1. A method for detecting broadband light, comprising:
generating a spin Seebeck effect (SSE) in a device by illuminating the device with light, the device comprising a bilayer structure disposed over a substrate, the bilayer structure comprising a non-magnetic metal layer and a magnetic insulator layer;
measuring the SSE based on a field modulation method;
determining, based on the measuring, an optically-created thermal gradient of the device; and
detecting a wavelength range of the light.

2. The method of claim 1, wherein a magnetic field is applied to the device in a direction perpendicular to a light direction.

3. The method of claim 1, wherein a magnetic field is applied to the device in a direction parallel to a light direction.

4. The method of claim 1, wherein detecting a wavelength range comprises:
generating a voltage in the device using the SSE; and
detecting the generated voltage.

5. The method of claim 1, wherein the wavelength range is from about 390 nm to about 2200 nm.

6. The method of claim 1, wherein the non-magnetic metal layer comprises Pt, W, Ir, Ru, Pd, Cu, Au, Bi, Ta, or a non-magnetic alloy thereof.

7. The method of claim 1, wherein the magnetic insulator layer comprises nickel ferrite, a rare earth iron garnet, or a combination thereof.

8. The method of claim 7, wherein the rare earth iron garnet comprises yttrium iron garnet, europium iron garnet, thulium iron garnet, lutetium iron garnet, gadolinium iron garnet, or a combination thereof.

9. The method of claim 1, wherein the substrate comprises gadolinium gallium garnet, yttrium aluminum garnet, strontium titanium oxide, neodymium gallium garnet, silicon, or a combination thereof.

10. The method of claim 1, wherein the non-magnetic metal layer has a thickness of less than about 6 nm.

11. An apparatus for detecting broadband light, comprising:
a multilayer structure, the multilayer structure configured to generate an electrical voltage from a spin current;
an electromagnet configured to apply a magnetic field to the multilayer structure;
a voltmeter coupled to the multilayer structure;
an excitation source to emit light, the excitation source optically coupled to the multilayer structure; and
an optical device configured to direct the light towards the multilayer structure, the optical device comprising:
a plurality of reflecting facets;
a linear polarizer;
a wave plate; and
an optical chopper.

12. The apparatus of claim 11, wherein the multilayer structure comprises:
a substrate;
a magnetic insulator layer disposed over the substrate; and
a non-magnetic metal layer disposed over a magnetic insulator layer.

13. The apparatus of claim 12, wherein:
the non-magnetic metal layer comprises Pt, W, Ir, Ru, Pd, Cu, Au, Bi, Ta, or a non-magnetic alloy thereof;
the magnetic insulator layer comprises nickel ferrite, a rare earth iron garnet, or a combination thereof;
the substrate comprises gadolinium gallium garnet, yttrium aluminum garnet, strontium titanium oxide, neodymium gallium garnet, silicon, or a combination thereof; or
a combination thereof.

14. The apparatus of claim 13, wherein the rare earth iron garnet comprises yttrium iron garnet, europium iron garnet, thulium iron garnet, lutetium iron garnet, gadolinium iron garnet, or a combination thereof.

15. The apparatus of claim 12, wherein:
the non-magnetic metal layer comprises Pt;
the magnetic insulator layer comprises yttrium iron garnet; and
the substrate comprises gadolinium gallium garnet.

16. The apparatus of claim 11, wherein the electromagnet is further configured to rotate about an axis of the multilayer structure.

17. An apparatus for detecting broadband light, comprising:
a thermal electric cooler;
a heat sink disposed over at least a portion of the thermal electric cooler, the heat sink thermally coupled to the thermal electric cooler;
a multilayer structure disposed over at least a portion of the heat sink, the multilayer structure comprising a substrate, a magnetic insulator layer disposed over the substrate, and a non-magnetic metal layer disposed over the magnetic insulator layer; and
a voltmeter coupled to the multilayer structure.

18. The apparatus of claim 17, wherein:
the non-magnetic metal layer comprises Pt, W, Ir, Ru, Pd, Cu, Au, Bi, Ta, or a non-magnetic alloy thereof;
the magnetic insulator layer comprises nickel ferrite, a rare earth iron garnet, or a combination thereof;
the substrate comprises gadolinium gallium garnet, yttrium aluminum garnet, strontium titanium oxide, neodymium gallium garnet, silicon, or a combination thereof; or
a combination thereof.

19. The apparatus of claim 17, wherein:
the non-magnetic metal layer comprises Pt;
the magnetic insulator layer comprises yttrium iron garnet; and
the substrate comprises gadolinium gallium garnet.

20. The apparatus of claim 17, wherein the non-magnetic metal layer has a thickness of less than about 6 nm.